(12) United States Patent
Takagi et al.

(10) Patent No.: US 7,109,682 B2
(45) Date of Patent: Sep. 19, 2006

(54) CONTACTLESS POWER TRANSMITTING DEVICE

(75) Inventors: Tsutomu Takagi, Shiojiri (JP); Koji Ishizawa, Chino (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/980,987

(22) Filed: Nov. 4, 2004

(65) Prior Publication Data
US 2005/0134213 A1      Jun. 23, 2005

(30) Foreign Application Priority Data
Nov. 5, 2003     (JP)     ............... 2003-375757

(51) Int. Cl.
*H01M 10/46*     (2006.01)
(52) U.S. Cl. ............... 320/108; 320/119; 363/74
(58) Field of Classification Search ............... 320/108, 320/109, 114, 119, 124; 363/17, 74, 79, 363/39, 65
See application file for complete search history.

(56) References Cited

U.S. PATENT DOCUMENTS

| | | | |
|---|---|---|---|
| 4,031,449 A * | 6/1977 | Trombly | 320/108 |
| 5,659,237 A * | 8/1997 | Divan et al. | 320/119 |
| 5,929,598 A | 7/1999 | Nakama | |
| 6,442,047 B1 * | 8/2002 | Cohen | 363/17 |
| 6,697,272 B1 | 2/2004 | Nanbu | |
| 6,727,809 B1 * | 4/2004 | Smith | 340/438 |
| 6,972,543 B1 * | 12/2005 | Wells | 320/108 |

FOREIGN PATENT DOCUMENTS

| | | |
|---|---|---|
| JP | 09-103037 | 4/1997 |
| JP | 10-023677 | 1/1998 |
| JP | 2001-186676 | 7/2001 |
| JP | 2002-272020 | 9/2002 |
| JP | 2003-235168 | 8/2003 |

OTHER PUBLICATIONS

Examination result issued in corresponding Japanese application.

* cited by examiner

*Primary Examiner*—Rajnikant B. Patel
(74) *Attorney, Agent, or Firm*—Harness, Dickey & Pierce, P.L.C.

(57) ABSTRACT

A contactless power transmitting device is provided including a power transmitting device functioning as a charger, a power transmitting-receiving sharing device functioning as a charger and including a secondary battery, and a power receiving device including a secondary battery. The power transmitting-receiving sharing device is used as a power supply for portable computers. The power receiving device is used as a power supply for cellular phones. The power transmitting device forms a contactless power transmitting device respectively by electromagnetically coupling to either the power transmitting-receiving sharing device or the power receiving device to charge the secondary battery or the secondary battery. The power transmitting-receiving sharing device forms the contactless power transmitting device by electromagnetically coupling to the power receiving device. In this case, the power transmitting-receiving sharing device charges the secondary battery included in the power receiving device.

9 Claims, 8 Drawing Sheets

CONTACTLESS POWER TRANSMITTING DEVICE

RELATED APPLICATIONS

This application claims priority to Japanese Patent Application No. 2003-375757 filed Nov. 5, 2003 which is hereby expressly incorporated by reference herein in its entirety.

BACKGROUND

1. Field of the Invention

The present invention relates to a contactless power transmitting device that includes a power transmitting circuit and a power receiving circuit which are both electromagnetically coupled by a transformer and can charge a secondary battery by utilizing an output electric power of the power receiving circuit

2. Related Art

As shown in FIG. 8, a device including an alternating current/direct current (AC/DC) converter 1, a power transmitting circuit 2, a transformer 5 having a primary coil 3 and a secondary coil 4, a power receiving circuit 6 and a secondary battery 7 is known as a kind of contactless power transmitting device. Further, the primary coil 3 and the second coil 4 that are included in the transformer 5 are used by approaching each other so as to be electromagnetically coupled when the secondary battery 7 is charged. After use, they can easily and physically be separated. (For example, refer to Japanese Unexamined Patent Publication Nos. 10-23677 and 2002-272020).

In the contactless power transmitting device configured in this way, the AC/DC converter 1 converts an alternating voltage to a direct current voltage. The power transmitting circuit 2 produces the alternating voltage having a predetermined frequency by utilizing the direct current voltage from the AC/DC converter 1 so as to supply the produced alternating voltage to the primary coil 3. An alternating current is induced by the alternating voltage supplied to the primary coil 3 in the secondary coil 4, the alternating current induced in the secondary coil 4 is supplied to the power receiving circuit 6. The power receiving circuit 6 rectifies the alternating current induced in the secondary coil 4 to the direct current voltage so as to be output. The secondary battery 7 is charged by the direct current voltage.

As above-mentioned, in the conventional contactless power transmitting device shown in FIG. 8, the primary coil 3 and the second coil 4 included in the transformer 5 are used by approaching each other when the secondary battery 7 is charged. After charging is complete, both can be easily physically separated. Therefore, it is convenient to use the conventional contactless power transmitting device as a power supply (secondary battery) for cellular phones and portable personal computers.

Meanwhile, cellular phones are remarkably spreading in popularity. Unfortunately, a cellular phone cannot be used after it runs out of power (loses the charge in its power supply). This often occurs when a user is away from his or her office. The conventional contactless power transmitting device cannot cope easily and promptly with this situation.

In addition to cellular phones, portable computers are also remarkably spreading in popularity. The number of businessmen and the like carrying both when they are away from their office is increasing. Notably, cellular phones have a smaller power supply capacity than that of portable computers.

Thus, when the power supply charge for the cellular phone is exhausted, it would be extremely convenient to charge the power supply of the cellular phone by utilizing the power supply for a portable computer, which could easily and promptly cope with the situation.

It should also be noted that in the conventional contactless power transmitting device, the secondary battery 7 is charged by bringing the primary coil 3 and the secondary coil 4 in the transformer 5 toward each other as above mentioned. Thus, the device offers convenience for use as a power supply for cellular phones, portable computers, or the like.

However, in the case in which the power transmitting circuit 2 starts operation in conditions where the coils 3 and 4 are next to each other, if the power transmitting circuit 2 and the power receiving circuit 6 are mismatched in specifications or the like, proper operation is not performed between the power transmitting circuit 2 and the power receiving circuit 6, thereby causing defects and the like. This is not preferable from a safety point of view.

Taking the aforesaid situation into account, if a power supply for cellular phones or the like runs out when a user is away from his or her office and the power supply is charged without contact, the present invention firstly aims to provide a contactless power transmitting device that can easily and promptly be charged at the place where the user is located.

In addition, taking the aforesaid situation into account, if a power supply for cellular phones, portable computers or the like runs out and the power supply is charged without contact, the present invention secondly aims to provide a contactless power transmitting device that can achieve an improvement in safety and fraud prevention in the charging operation.

Further, if a power supply for cellular phones or the like runs out when a user is away from his or her office and the power supply is charged without contact, the present invention thirdly aims to provide a contactless power transmitting device that can perform the charging easily and promptly, and achieve an improvement in safety and fraud prevention in the charging operation at the place where the user is located.

SUMMARY

In order to achieve the first aim of the present invention by solving the above problems, aspects of the invention are configured as below.

A first aspect of the invention includes a power transmitting device including a first coil, a power transmitting-receiving sharing device including a second coil and a first secondary battery, and a power receiving device including a third coil and a second secondary battery. The power transmitting device includes a power transmitting means producing an alternating current supplied to the first coil if the first coil is electromagnetically coupled to the second coil or the third coil. The power transmitting-receiving sharing device includes a power transmitting means producing an alternating current supplied to the second coil using the first secondary battery as a power supply if the second coil is electromagnetically coupled to the third coil, and a power receiving means converting an alternating current induced in the second coil to a direct current if the second coil is electromagnetically coupled to the first coil so as to charge the first secondary battery with the converted direct current. The power receiving device includes a power receiving means converting an alternating current induced in the third coil to a direct current if the third coil is electromagnetically coupled to the first coil or the second coil so as to charge the second secondary battery with the converted direct current.

A second aspect of the invention includes a power transmitting device including a first coil, a power transmitting-receiving sharing device including a second coil and a first secondary battery, and a power receiving device including a third coil and a second secondary battery. The first coil, the second coil, and the third coil are configured so as to be electromagnetically coupled to each other and to be separable from each other. The power transmitting device includes a power transmitting means producing an alternating current supplied to the first coil. The power transmitting-receiving sharing device includes a power transmitting means producing an alternating current supplied to the second coil, a power receiving means converting an alternating current induced in the second coil to a direct current, a first coupling means selectively coupling the second coil to the power transmitting means or the power receiving means, a second coupling means selectively coupling the first secondary battery to the power transmitting means or the power receiving means, and a control means controlling the coupling of the first coupling means and the second coupling means respectively based on selection data. The power receiving device includes a power receiving means converting an alternating current induced in the third coil to a direct current so as to charge the second secondary battery with the converted direct current.

In the second aspect of the invention, the power transmitting-receiving sharing device further includes a setting means selectively setting the use of the power transmitting means or the power receiving means to the control means, and a display means displaying the setting condition of the setting means. The control means controls the coupling of the first coupling means and the second coupling means based on the setting of the setting means.

In the contactless power transmitting device, the power transmitting-receiving sharing device further includes a remaining charge measuring means measuring a remaining charge of the first secondary battery if the first secondary battery is used as a power supply for the power transmitting means. The control means stops the operation of the power transmitting means if the value of the measured remaining charge of the remaining charge measuring means is equal to or less than a predetermined value.

According to the above mentioned aspects of the invention, in the case in which a power supply for cellular phones or the like runs out when a user is away from his or her office and the power supply is charged without contact, the charging operation can easily and promptly be performed at the place where the user is located.

In order to achieve the second aim of the present invention, aspects of the invention are configured as below.

In a contactless power transmitting device that includes a power transmitting device, a power receiving device, a transformer including a first coil coupled to the power transmitting device and a second coil coupled to the power receiving device, the first coil and the second coil being configured so as to be electromagnetically coupled to each other and to be separable from each other of a third aspect of the invention, the power transmitting device and the power receiving device are configured as follows. The power transmitting device includes a power transmitting means producing an alternating current supplied to the first coil, a receiving means receiving an identification signal to identify the power receiving device, the identification signal transmitted in a power line coupled to the first coil, and a control means controlling the power transmitting of the power transmitting means if the power transmitting means starts transmitting power. The power receiving device includes a power receiving means converting an alternating current induced in the second coil to a direct current, and a transmitting means producing the identification signal transmitted in a power line coupled to the second coil so as to supply the produced identification signal to the power line. In addition, the control means controls the power transmitting means to perform a pre-power transmission for a predetermined time before starting to transmit power by electromagnetically coupling the first coil and the second coil. The control means determines whether or not the identification signal received by the receiving means coincides with an identification signal for reference during the pre-power transmission. If both coincide, the control means controls the power transmitting means to start transmitting power, if both fail to coincide, the control means controls the power transmitting means to not start transmitting power.

In a contactless power transmitting device that includes a power transmitting device, a power receiving device, a transformer including a first coil coupled to the power transmitting device and a second coil coupled to the power receiving device, the first coil and the second coil being configured so as to be electromagnetically coupled to each other and to be separable from each other of a fourth aspect of the invention, the power transmitting device and the power receiving device are configured as follows. The power transmitting device includes a power transmitting means producing an alternating current supplied to the first coil, a power meter measuring power transmitted by the power transmitting means, a receiving means receiving an identification signal to identify the power receiving device and an operation completion signal to show completion of the charging operation of a power receiving means, the identification signal and the operation completion signal transmitted in a power line coupled to the first coil, and a control means controlling the power transmitting of the power transmitting means according to a reception of the receiving means. The power receiving device includes a power receiving means converting an alternating current induced in the second coil to a direct current, and a transmitting means respectively producing the identification signal and the operation completion signal that are transmitted in the power line coupled to the second coil so as to supply the produced identification signal and the operation completion signal to the power line respectively. In addition, the control means controls the power transmitting means to perform a pre-power transmission for a predetermined time before starting to transmit power by electromagnetically coupling the first coil and the second coil. The control means determines whether or not the identification signal received by the receiving means coincides with an identification signal for reference during the pre-power transmission. If both coincide, the control means controls the power transmitting means to start transmitting power. At the same time, the control means starts to load a measured value of the power meter. If both fail to coincide, the control means controls the power transmitting means to not start transmitting power. The control means calculates a fee for charging based on the measured value if the receiving means receives the operation completion signal after starting the power transmitting by the power transmitting means.

The contactless power transmitting device of the fourth aspect of the invention further includes a display means displaying the fee for charging calculated by the control means.

According to the above-mentioned aspects of the invention, in the case in which a power supply for cellular phones or portable personal computers runs out and the power supply is charged without contact, an improvement in safety or fraud prevention in the charging operation can be achieved.

In order to achieve the third aim of the present invention, aspects of the invention are configured as below.

A fourth aspect of the invention includes a power transmitting device including a first coil, a power transmitting-receiving sharing device including a second coil and a first secondary battery, and a power receiving device including a third coil and a second secondary battery. The first coil, the second coil, and the third coil are configured so as to be electromagnetically coupled to each other and to be separable from each other. The power transmitting device includes a power transmitting means producing an alternating current supplied to the first coil. The power receiving device includes a power receiving means converting an alternating current induced in the third coil to a direct current so as to charge the second secondary battery with the converted direct current, and a transmitting means producing an identification signal to identify the power receiving device if the power receiving means starts receiving power, the identification signal being transmitted in a power line coupled to the third coil, and supplying the produced identification signal to the power line. The power transmitting-receiving sharing device includes a power transmitting means producing an alternating current supplied to the second coil, a power receiving means converting an alternating current induced in the second coil to a direct current, a receiving means receiving the identification signal from the transmitting means, the identification signal being transmitted in the power line coupled to the second coil, a first coupling means selectively coupling the second coil to the power transmitting means or the power receiving means, a second coupling means selectively coupling the first secondary battery to the power transmitting means or the power receiving means, and the control means. The control means performs in the following way. The control means controls the power transmitting means and the second coil so as to be coupled by the first coupling means, and, simultaneously, the first secondary battery and the power transmitting means so as to be coupled by the second coupling means. The control means controls the power transmitting means to perform a pre-power transmission for a predetermined time before starting to transmit power by electromagnetically coupling the second coil and the third coil. The control means determines whether or not the identification signal received by the receiving means coincides with an identification signal for reference during the pre-power transmission. If both coincide, the control means controls the power transmitting means to start transmitting power, if both fail to coincide, the control means controls the power transmitting means to not start transmitting power.

In the contactless power transmitting device, the power transmitting-receiving sharing device further includes a remaining charge measuring means measuring a remaining charge of the first secondary battery if the first secondary battery is used as a power supply for the power transmitting means. The control means stops the operation of the power transmitting means if the value of the measured remaining charge of the remaining charge measuring means is equal to or less than a predetermined value.

According to the above-mentioned aspects of the invention, in the case in which a power supply for a cellular phone or portable personal computer runs out when a user is away from his or her office and the power supply is charged without contact, the charging operation can easily and promptly be performed at the place where the user is located, and an improvement in safety or fraud prevention in the charging operation can be achieved.

DETAILED DESCRIPTION

Embodiments according to the present invention will be explained below with reference to the drawings.

A configuration of a contactless power transmitting device of a first embodiment of the present invention will be explained with reference to FIGS. 1 and 2.

Figure 1:
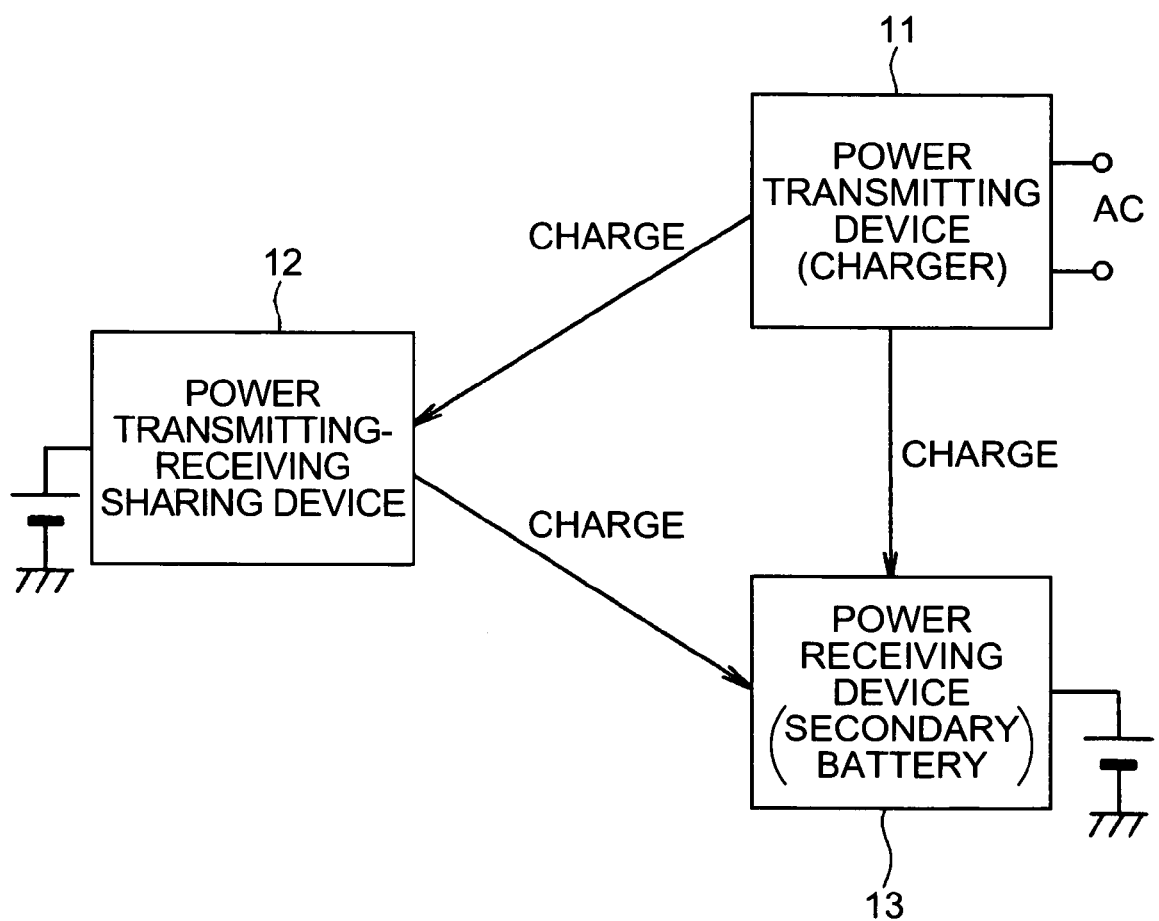
FIG. 1 is a diagram to explain a concept of the configuration of a first embodiment of the present invention.

As shown in FIG. 1, the contactless power transmitting device of the first embodiment includes a power transmitting device 11 functioning as a charger, a power transmitting-receiving sharing device 12 functioning as a charger and including a secondary battery, and a power receiving device 13 including a secondary battery.

The power transmitting device 11 is electromagnetically coupled to the power transmitting-receiving sharing device 12 or the power receiving device 13 so as to form the contactless power transmitting device respectively. If the power transmitting device 11 is coupled to the power transmitting-receiving sharing device 12, the power transmitting device 11 charges the secondary battery included in the power transmitting-receiving sharing device 12. If the power transmitting device 11 is coupled to the power receiving device 13, the power transmitting device 11 charges the secondary battery included in the power receiving device 13. In addition, the power transmitting-receiving sharing device 12 forms the contactless power transmitting device by electromagnetically coupling to the power receiving device 13. In this case, the power transmitting-receiving sharing device 12 charges the secondary battery included in the power receiving device 13.

Here, the power transmitting-receiving sharing device 12 is used, for example, as a power supply for portable terminals such as portable computers or the like. The power receiving device 13 is used, for example, as a power supply for cellular phones.

Next, a specific configuration of each part of the first embodiment will be explained with reference to FIG. 2.

Figure 2:
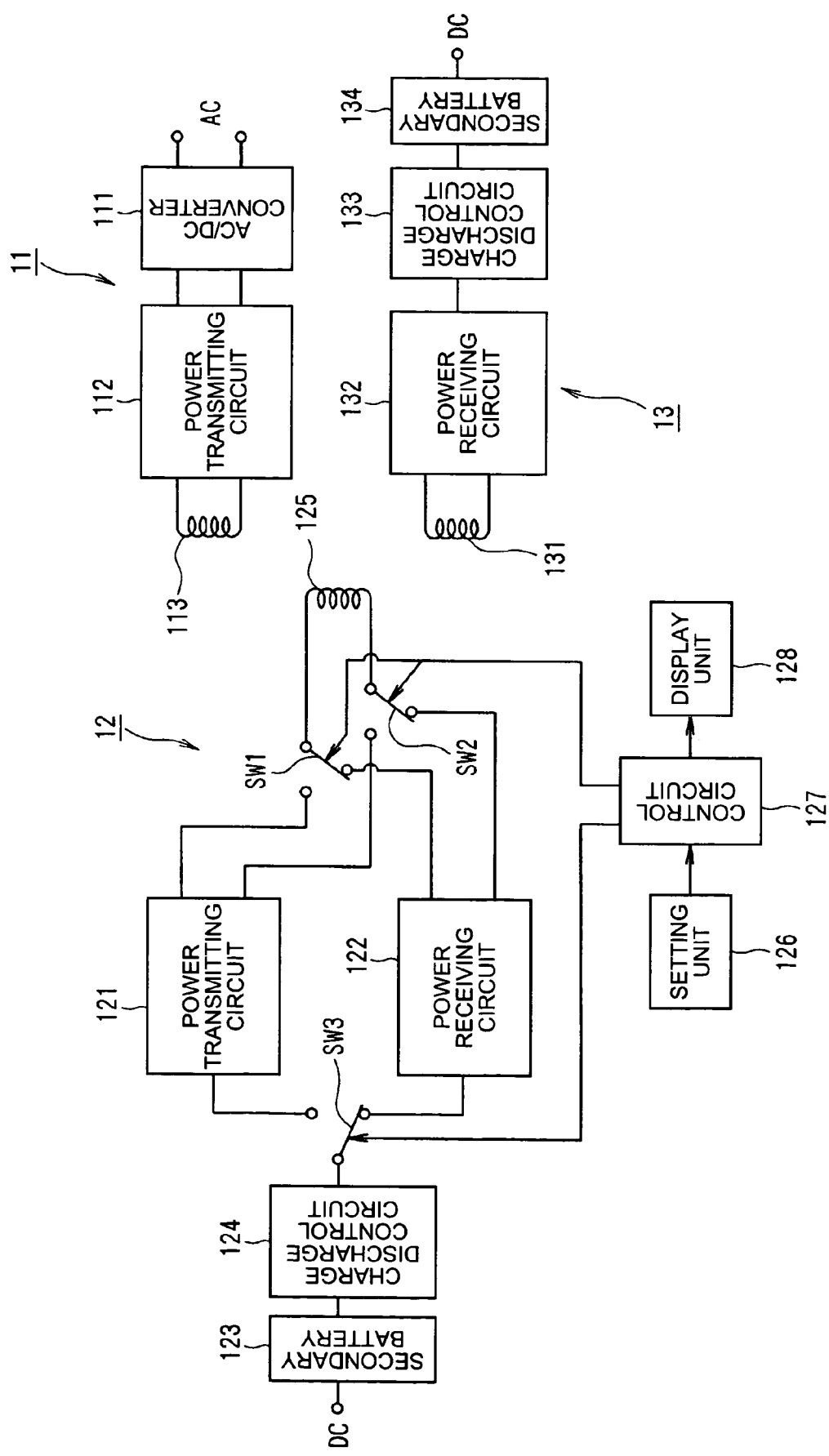
FIG. 2 is a block diagram illustrating the configuration of the first embodiment.

As shown in FIG. 2, the power transmitting device 11 includes an AC/DC converter 111, a power transmitting circuit 112, and a coil 113.

The AC/DC converter 111, which, for example, converts the alternating voltage of, for example, 100 or 110 volts, supplied to homes to a predetermined direct current voltage, supplies the converted direct current voltage to the power transmitting circuit 112. The power transmitting circuit 112, which produces an alternating voltage having a predetermined frequency by using the direct current voltage from the AC/DC converter 111, supplies the produced alternating voltage to the coil 113.

As shown in FIG. 2, the power transmitting-receiving sharing device 12 includes a power transmitting circuit 121, a power receiving circuit 122, a secondary battery 123, a charge discharge control circuit 124, a coil 125, switches SW1 to SW3, a setting unit 126, a control circuit 127 and a display unit 128.

The power transmitting circuit 121 produces an alternating voltage having a predetermined frequency by using the direct current voltage supplied from the secondary battery 123 in operation, supplying the produced alternating voltage to the coil 125. If power is transmitted from the power transmitting device 11 to the power receiving circuit 122 by electromagnetically coupling between the coil 125 and the coil 113 in the power transmitting device 11, the power receiving circuit 122 rectifies an alternating voltage induced in the coil 125 to a direct current voltage. That is, the power receiving circuit 122 is an alternating current-direct current (AC-DC) converting circuit. The direct current voltage produced in the power receiving circuit 12 is supplied to the secondary battery 123 through the charge discharge control circuit 124 so as to charge the secondary battery 123.

The secondary battery 123 can be repeatedly used by charging after being discharged, for example, such as a lithium-ion battery.

If the secondary battery 123 is charged by the power receiving circuit 122, the charge discharge control circuit 124 controls (monitors) the charging operation. If the power transmitting circuit 121 or loads (not shown) are operated by the secondary battery 123, the charge discharge control circuit 124 controls (monitors) the discharge.

If the coil 125 is used by approaching the coil 113 in the power transmitting device 11, the coil 125 and the coil 113 are electromagnetically coupled so as to form a transformer therebetween. If the coil 125 is used by approaching the coil 131 in the power receiving device 13, the coil 125 and the coil 131 are electromagnetically coupled so as to form a transformer therebetween. That is, the coils 113, 125, and 131 can be electromagnetically interconnected and also mutually be separated.

The switches SW1 and SW2 selectively couple the coil 125 to either the power transmitting circuit 121 or the power receiving circuit 122. Also, the switch SW3 selectively couples the secondary battery 123 to either the power transmitting circuit 121 or the power receiving circuit 122. Each contact of the switches SW1 to SW3 is normally, for example, coupled to the power receiving circuit 122 side as shown in FIG. 2.

The setting unit 126, in which a user selectively sets the use of the power transmitting circuit 121 or the power receiving circuit 122, inputs the set data to the control circuit 127. The control circuit 127 displays the operating conditions on the display unit 128 according to the set data from the setting unit 126, and controls the contact switching of the switches SW1 to SW3. The display unit 128, which is configured with a liquid crystal display unit or the like, displays predetermined information as described above.

As shown in FIG. 2, the power receiving device 13 includes a coil 131, a power receiving circuit 132, a charge discharge control circuit 133, and a secondary battery 134.

If the coil 131 is used by approaching the coil 113 in the power transmitting device 11, the coil 131 and the coil 113 are electromagnetically coupled so as to form a transformer therebetween. Also, if the coil 131 is used by approaching the coil 125 in the power transmitting-receiving sharing device 12, the coil 131 and the coil 125 are electromagnetically coupled so as to form a transformer therebetween. The alternating voltage induced in the coil 131 by electromagnetic coupling is supplied to the power receiving circuit 132.

The power receiving circuit 132 rectifies the alternating voltage induced in the coil 131 to a direct current voltage so as to be output. The direct current voltage output from the power receiving circuit 132 is supplied to the secondary battery 134 through the charge discharge control circuit 133 so as to charge the secondary battery 134. If the secondary battery 134 is charged by the output from the power receiving circuit 132, the charge discharge control circuit 133 controls the charging operation. If loads (not shown) are operated by the secondary battery 134, the charge discharge control circuit 133 controls the discharge.

Next, an operation example of the first embodiment will be explained with reference to FIGS. 1 and 2.

In this example, the case in which the power transmitting-receiving sharing device 12 is used as a power supply (secondary battery) for portable computers, and the power receiving device 13 is used as a power supply (secondary battery) for cellular phones will be explained.

Firstly, the case in which the secondary battery 123 in the power transmitting-receiving sharing device 12 is charged by using the power transmitting device 11 will be explained. In this case, a user places the coil 125 in the power transmitting-receiving sharing device 12 near the coil 113 in the power transmitting device 11 such that the coil 125 and the coil 113 are electromagnetically coupled.

In this condition, if the user sets the setting for charging the secondary battery 123 by using the power transmitting device 11 to the setting unit 126, the set data is input to the control circuit 127. The control circuit 127 controls the display unit 128 to display that the secondary battery 123 is charged by using the power transmitting device 11 according to the set data. Also, the control circuit 127 controls the switches SW1 to SW3 to fix each contact to the power receiving circuit 122 side.

As a result, the power transmitting device 11 starts to charge the secondary battery 123 in the power transmitting-receiving sharing device 12.

In this charging sequence, the secondary battery 123 is charged by the power receiving circuit 122. Also, the charge discharge control circuit 124 monitors the charging conditions of the secondary battery 123. When the charging operation is completed, the charge discharge control circuit 124 controls the power receiving circuit 122 to stop charging the secondary battery 123.

Next, the case in which the secondary battery 134 in the power receiving device 13 is charged by the power transmitting device 11 will be explained. In this case, a user places the coil 131 in the power receiving device 13 near the coil 113 in the power transmitting device 11 such that the coil 131 and the coil 113 are electromagnetically coupled.

As a result, the power transmitting device 11 starts to charge the secondary battery 134 in the power receiving device 13. In this charging sequence, the secondary battery 134 is charged by the power receiving circuit 132. Also, the charge discharge control circuit 133 monitors the charging conditions of the secondary battery 134. When the charging operation is completed, the charge discharge control circuit 133 controls the power receiving circuit 132 to stop charging the secondary battery 134.

Next, the following case will be explained. In this case, a user is away from his or her office and carries a cellular phone in which the power receiving device 13 is used (included) and a portable computer in which the power transmitting-receiving sharing device 12 is used. The secondary battery 134 in the power receiving device 13 used in the cellular phone needs to be charged at the place where the user is located because the charge of the secondary battery 134 has run out.

In this case, the user places the coil 131 in the power receiving device 13 near the coil 125 in the power transmitting-receiving sharing device 12 such that the coil 131 and the coil 125 are electromagnetically coupled when the user is away from his or her office. In this condition, if the user sets the setting for charging the secondary battery 134 by using the power transmitting-receiving sharing device 12 to the setting unit 126, the set data is input to the control circuit 127. The control circuit 127 controls the display unit 128 so as to display that the secondary battery 134 is charged with the power transmitting-receiving sharing device 12 according to the set data. Also, the control circuit 127 controls the switches SW1 to SW3 so as to fix each contact to the opposite position shown in FIG. 2, namely to the power transmitting circuit 121 side.

As a result, the power transmitting-receiving sharing device 12 starts to charge the secondary battery 134 in the power receiving device 13.

In this charging sequence, the secondary battery 134 is charged by the power receiving circuit 132. Also, the charge discharge control circuit 133 monitors the charging conditions of the secondary battery 134. When the charging operation is completed, the charge discharge control circuit 133 controls the power receiving circuit 132 to stop charging the secondary battery 134.

As explained above, the first embodiment includes the power transmitting device 11 functioning as the charger, the power transmitting-receiving sharing device 12 functioning as the charger and including the secondary battery 123, and the power receiving device 13 including the secondary battery 134.

Thus, according to the first embodiment, a charging operation can be performed easily and promptly in the following case. A user goes out carrying a cellular phone and a portable personal computer. The power transmitting-receiving sharing device 12 is used as the power supply for the portable computer. The power receiving device 13 is used as the power supply for the cellular phone. If the charge of the secondary battery 134 in the power receiving device 13 used in the cellular phone runs out at the place where the user is located, the secondary battery 134 can be charged there easily and promptly using the power transmitting-receiving sharing device 12 carried.

In addition, in the power transmitting-receiving sharing device 12 of the first embodiment, the coil 125 is shared with the power transmitting circuit 121 and the power receiving circuit 122. This enables the device to be compact and occupy little space.

Further, in the power transmitting-receiving sharing device 12 of the first embodiment, the setting to be used as the secondary battery or as the charger can be set arbitrarily and the setting condition can be recognized easily, thereby preventing false operation from an improper setting.

Next, another example of the power transmitting-receiving sharing device 12 used in the first embodiment will be explained with reference to FIG. 3.

In the first embodiment shown in FIG. 2, as described above, if the secondary battery 134 in the power receiving device 13 runs out when a user is away from his or her office, the secondary battery 134 can be charged at the place where the user is located using the power transmitting-receiving sharing device 12.

In this case, it is not preferable that the secondary battery 123 is exhausted in order to charge the secondary battery 134 in the power receiving device 13 while the secondary battery 123 in the power transmitting-receiving sharing device 12 is used.

The charge discharge control circuit 124 in the power transmitting-receiving sharing device 12 monitors the discharge conditions of the secondary battery 123 if the power transmitting circuit 121 is operated using the secondary battery 134. Thus, when the secondary battery 123 is discharged, the charge discharge control circuit 124, for example, performs counting with a count-down counter. The counting is referred to as remaining charge data of the secondary battery 123.

Figure 3:
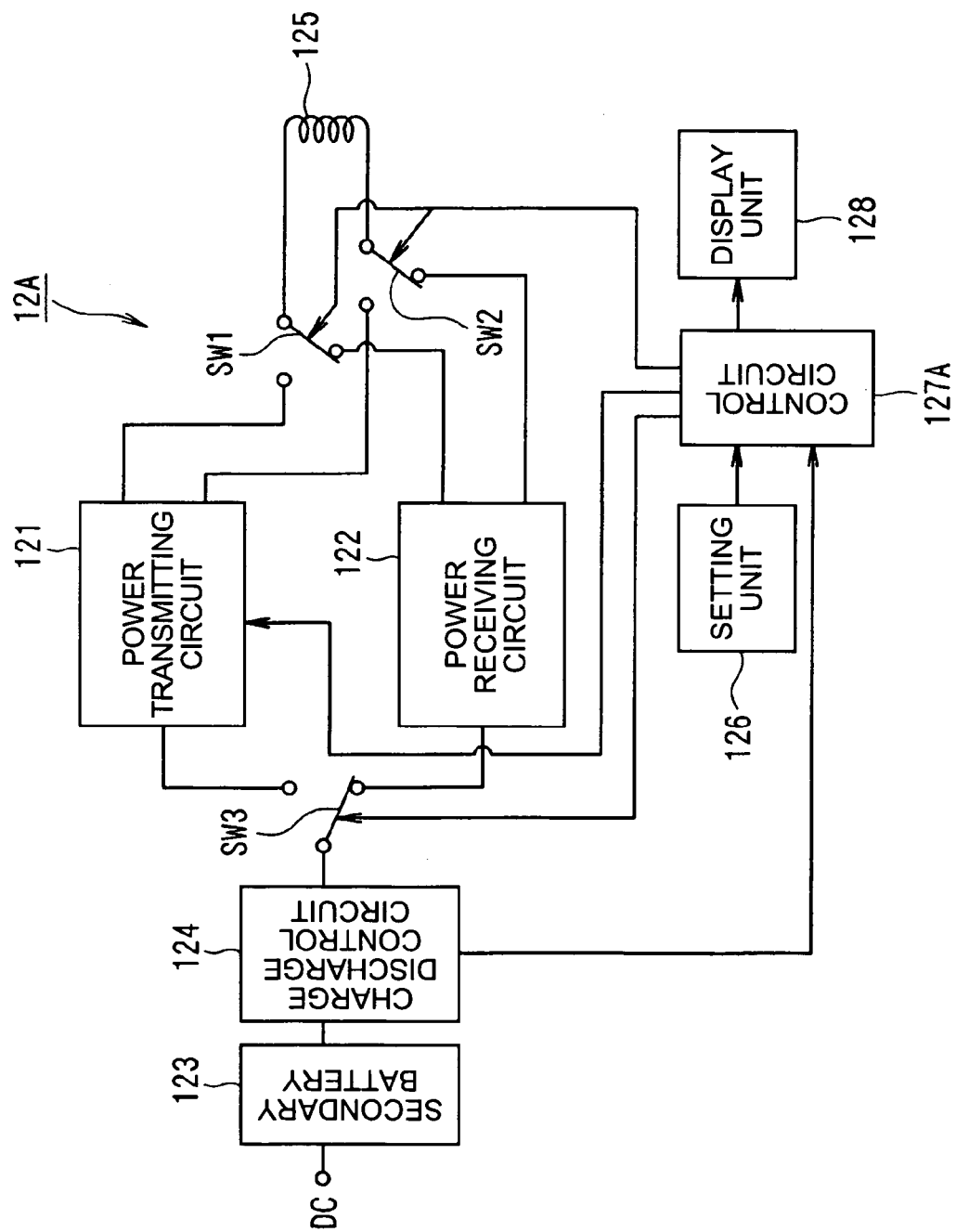
FIG. 3 is a block diagram illustrating another example of a power transmitting-receiving sharing device of the first embodiment.

Consequently, during the charging of the secondary battery 134 in the power receiving device 13, the remaining charge data from the charge discharge control circuit 124 is input to a control circuit 127A in a power transmitting-receiving sharing device 12A shown in FIG. 3. If the value of the remaining charge data shows a predetermined value or less during the charging of the secondary battery 134 in the power receiving device 13, the control circuit 127A stops the power transmitting operation of the power transmitting circuit 121 or controls the switch SW3 so as to select its contact from the power transmitting circuit 122 side to the power receiving circuit 122 side.

The configuration of the remaining parts of the power transmitting-receiving sharing device 12A are basically the same as those of the power transmitting-receiving sharing device 12 shown in FIG. 2. The same elements are given the same label and a duplicate explanation is omitted.

Next, A configuration of a contactless power transmitting device of a second embodiment of the present invention will be explained with reference to FIG. 4.

Figure 4:
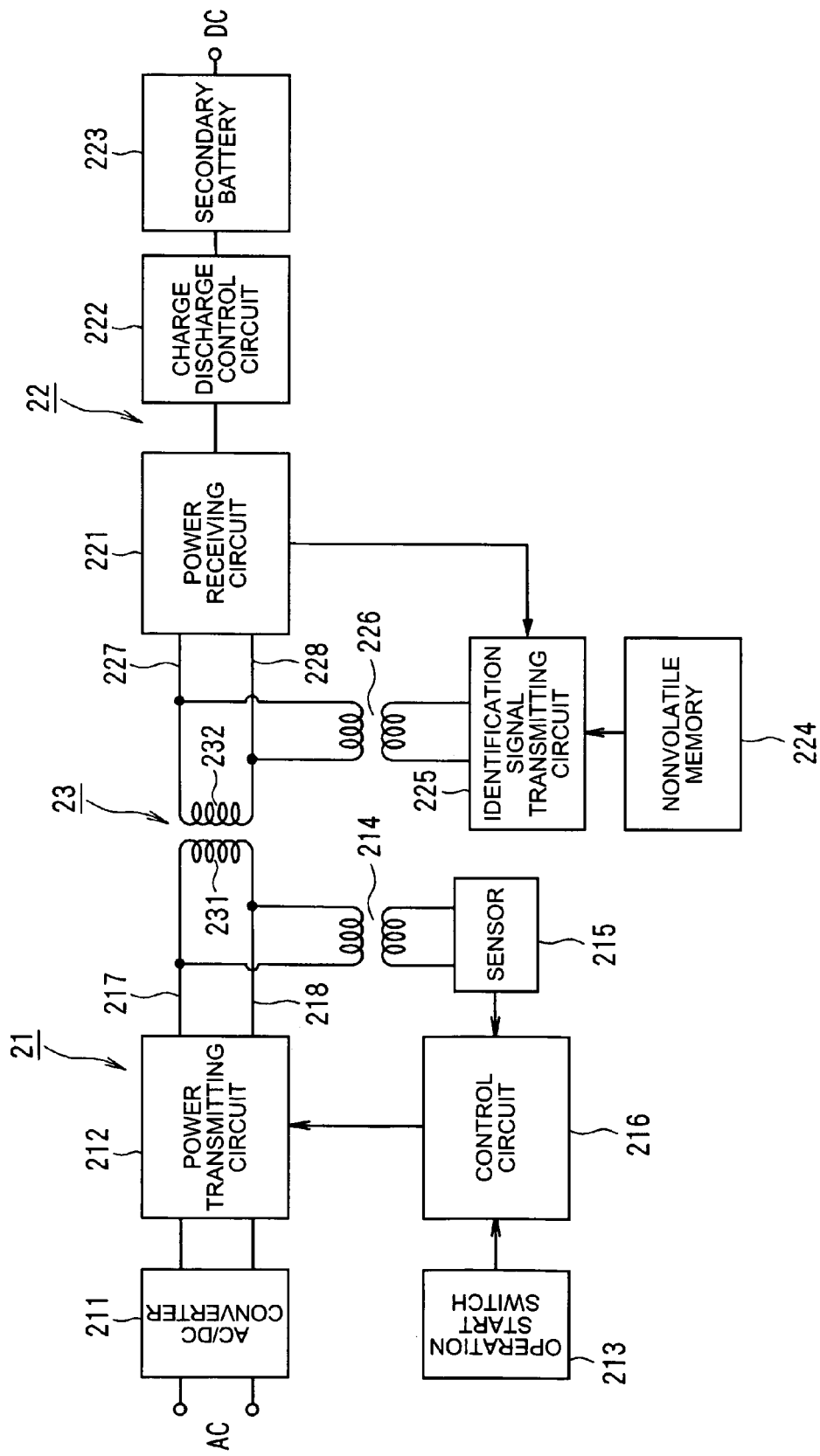
FIG. 4 is a block diagram illustrating the configuration of a second embodiment of the invention.

As shown in FIG. 4, a contactless power transmitting device of the second embodiment includes a power transmitting device 21 functioning as the charger, a power receiving device 22 including a secondary battery 223, and a transformer 23 electromagnetically coupling the power transmitting device 21 and the power receiving device 22. When the power transmitting device 21 charges the secondary battery in the power receiving device 22, an improvement in safety and fraud prevention of the charging operation can be achieved.

Here, the power receiving device 22 is used, for example, as the power supply for cellular phones, portable computers, and the like.

As shown in FIG. 4, the power transmitting device 21 includes an AC/DC converter 211, a power transmitting circuit 212, an operation start switch 213, a transformer 214, a sensor 215 and a control circuit 216.

The AC/DC converter 211, which, for example, converts the alternating voltage of, for example 100 or 110 volts, supplied to homes to a predetermined direct current voltage, supplies the converted direct current voltage to the power transmitting circuit 212. The power transmitting circuit 212, which produces an alternating voltage having a predetermined frequency by using the direct current voltage from the AC/DC converter 211, supplies the produced alternating voltage to a primary coil 231 included in the transformer 23.

The operation start switch 213 instructs the start of power transmitting from the power transmitting circuit 212, the instruction being input to the control circuit 216. The transformer 214 electromagnetically couples the sensor 215 and power lines 217 and 218 that are connected to both ends of the primary coil 231 respectively. The sensor 215 detects an identification signal transmitted in the power lines 217 and 218, the detected identification signal being input to the control circuit 216.

When the control circuit 216 controls the power transmitting circuit 212 so as to start transmitting power by the instruction from the operation start switch 213, prior to the power transmitting, the control circuit 216 controls the power transmitting circuit 212 so as to perform a pre-power transmission. During the pre-power transmission, the control circuit 216 determines whether or not an identification signal (described later) received by the sensor 215 coincides with an identification signal for reference.

In addition, as a result of the determination, if both coincide, the control circuit 216 controls the power transmitting circuit 212 so as to start transmitting power. If both fail to coincide, the control circuit 216 controls the power transmitting circuit 212 to not start transmitting power.

As shown in FIG. 4, the power receiving device 22 includes a power receiving circuit 221, a charge discharge control circuit 222, a secondary battery 223, a nonvolatile memory 224, an identification signal transmitting circuit 225 and a transformer 226.

The power receiving circuit 221 rectifies an alternating voltage induced in a secondary coil 232 of the transformer 23 to a direct current voltage. That is, the power receiving circuit 221 is an AC-DC converting circuit. The direct current voltage produced in the power receiving circuit 221 is supplied to the secondary battery 223 through the charge discharge control circuit 222 so as to charge the secondary battery 223.

The secondary battery 223 can be repeatedly used by charging after being discharged, for example, such as the lithium-ion battery. If the secondary battery 223 is charged by the power receiving circuit 221, the charge discharge control circuit 222 controls the charging operation. If loads (not shown) are operated by the secondary battery 223, the charge discharge control circuit 222 controls the discharge.

The nonvolatile memory 224 stores the identification signal to identify the power receiving device 22 as a form of digital data. The identification signal is read out by the identification signal transmitting circuit 225. The identification signal transmitting circuit 225 supplies the identification signal read out from the nonvolatile memory 224 to the power lines 227 and 228 that are connected to both ends of the transformer 3 respectively through the transformer 226.

Next, an operation example of the second embodiment configured as above-mentioned will be explained with reference to FIG. 4.

In this example, in the case in which the power receiving device 22 is used, for example, as the power supply (secondary battery) for cellular phones or portable computers, the case in which the secondary battery 223 in the power receiving device 22 is charged using the power transmitting device 21 will be explained.

In this case, a user places the primary coil 231 and the secondary coil 232 that are included in the transformer 23 near each other such that the coil 231 and the coil 232 are electromagnetically coupled. In this condition, if the user operates the operation start switch 213 in order to instruct the power transmitting circuit 212 to start transmitting power, the instructed data is input to the control circuit 216.

The control circuit 216, corresponding to the instructed data, controls the power transmitting circuit 212 so as to perform a pre-power transmission for a predetermined time prior to the power transmitting operation of the power transmitting circuit 212. Since the power transmitting circuit 212 performs the pre-power transmission, the power transmitting circuit 212 produces an alternating voltage for the predetermined time. The produced alternating voltage is transmitted to the power receiving circuit 221 through the transformer 23.

The power receiving circuit 221 notifies the identification signal transmitting circuit 225 that the pre-power transmission is performed at the same time that the power receiving circuit 221 rectifies the transmitted alternating voltage to a direct current voltage. Based on the notification, the identification signal transmitting circuit 225 reads out the identification signal to identify the power receiving device 22 from the nonvolatile memory 224 so as to supply the read out identification signal, through the transformer 226, to the power lines 227 and 228 that are connected to both ends of the transformer 23 respectively.

Since the identification signal is transmitted to the power lines 217 and 218 through the transformer 23, the sensor 215 detects the identification signal in the power lines 217 and 218. Then, the detected identification signal is input to the control circuit 216.

The control circuit 216 determines whether or not the identification signal detected by the sensor 215 coincides with an identification signal for reference. As a result of the determination, if both coincide, the control circuit 216 controls the power transmitting circuit 212 so as to start transmitting power. If both fail to coincide, the control circuit 216 controls the power transmitting circuit 212 to not start transmitting power.

As explained above, in the second embodiment, when the power transmitting device 21 charges the secondary battery 223 in the power receiving device 22, the power transmitting device 21 determines whether or not the power receiving device 22 is a correct (qualified) device prior to the charging operation. If the power receiving device 22 is the correct device, then the power transmitting device 21 starts charging. Consequently, in the second embodiment, if there is a difference between the power transmitting device 21 and the power receiving device 22 in specifications or the like, the power transmitting device cannot perform the charging operation, thereby enabling an improvement in safety and fraud prevention of the charging operation to be achieved.

Next, a configuration of a contactless power transmitting device of a third embodiment of the present invention will be explained with reference to FIG. 5.

In the second embodiment shown in FIG. 4, as above-mentioned, safety and fraud prevention in the charging operation of the power transmitting device 21 can be achieved. However, since a fee for the charging operation cannot be collected from users, the device cannot be used in a gas station or the like.

Figure 5:
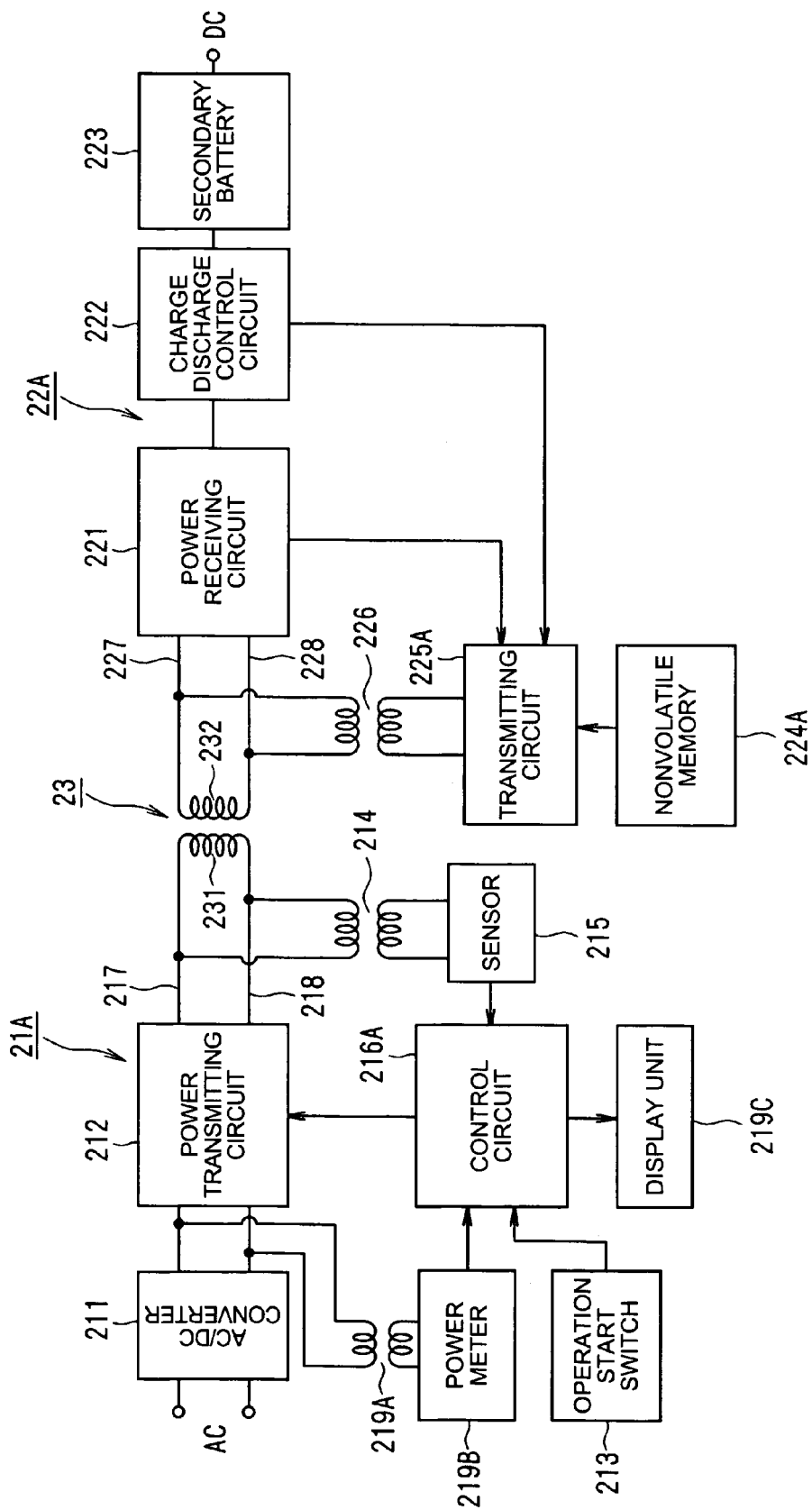
FIG. 5 is a block diagram illustrating the configuration of a third embodiment of the invention.

As shown in FIG. 5, the third embodiment includes a power transmitting device 21A functioning the charger, a power receiving device 22A including a secondary battery, a transformer 23 electromagnetically coupling the power transmitting device 21A and the power receiving device 22A. If the power transmitting device 21A charges the secondary battery in the power receiving device 22A, the charging operation can correctly be performed and a fee for the charging operation can be collected from users, thereby enabling the device to be installed and used in a gas station or the like.

Here, the power receiving device 22A is used, for example, as the power supply for cellular phones, portable computers, or the like.

The third embodiment is based on the configurations of the second embodiment shown in FIG. 4 and differs in the following elements. As shown in FIG. 5, a transformer 219A, a power meter 219B and a display unit 219C are added. The control circuit 216, the nonvolatile memory 224 and the identification signal transmitting circuit 225 that are shown in FIG. 4 are respectively replaced with a control circuit 216A, a nonvolatile memory 224A and an identification signal transmitting circuit 225A that are shown in FIG. 5.

As shown in FIG. 5, the power transmitting device 21A includes the AC/DC converter 211, the power transmitting circuit 212, the operation start switch 213, a transformer 219A, a power meter 219B, the transformer 214, the sensor 215, a control circuit 216A and a display unit 219C.

The power meter 219B measures power supplied to the power transmitting circuit 212 from the AC/DC converter 211 and is electromagnetically coupled to output lines of the AC/DC converter 211 through the transformer 219A. The power measured by the power meter 219B is input to the control circuit 216A. The display unit 219C displays the fee for the charging operation that is calculated by the control circuit 216 as described later.

When the control circuit 216A controls the power transmitting circuit 212 so as to start transmitting power by the instruction from the operation start switch 213, prior to the power transmitting, the control circuit 216A controls the power transmitting circuit 212 so as to perform a pre-power transmission for a predetermined time. During the pre-power transmission, the control circuit 216 determines whether or not an identification signal (described later) received by the sensor 215 coincides with an identification signal for reference.

In addition, as a result of the determination, if both coincide, the control circuit 216A controls the power transmitting circuit 212 so as to start transmitting power. At the same time, the control circuit 216A loads the power measured by the power meter 219B so as to start accumulating the power. If both fail to coincide, the control circuit 216A controls the power transmitting circuit 212 to not start transmitting power.

Further, if the sensor 215 receives a charge completion signal described later, the control circuit 216A calculates a fee for the charging operation based on the accumulated value of the power and then controls the display unit 219C so as to display the calculated fee for the charging operation.

Since configurations of the remaining parts of the power transmitting device 21A are the same as those of the power transmitting device 21 shown in FIG. 4, explanations for them are omitted.

As shown in FIG. 5, the power receiving device 22A includes the power receiving circuit 221, the charge discharge control circuit 222, the secondary battery 223, a nonvolatile memory 224A, a transmitting circuit 225A and the transformer 226.

The nonvolatile memory 224A stores the identification signal to identify the power receiving device 22A and the charge completion signal to show the charge completion of the power receiving device 22A as a form of digital data. The identification signal and the charge completion signal are read out by the transmitting circuit 225A. The transmitting circuit 225A supplies the identification signal or the charge completion signal read out from the nonvolatile memory 224A to the power lines 227 and 228 that are connected to both ends of the transformer 23 respectively through the transformer 226.

Next, an operation example of the third embodiment configured as above-mentioned will be explained with reference to FIG. 5.

In this example, in the case in which the power receiving device 22A is used, for example, as the power supply for cellular phones or portable computers, the case in which the secondary battery 223 in the power receiving device 22A is charged using the power transmitting device 21A will be explained.

In this case, a user places the primary coil 231 and the secondary coil 232 that are included in the transformer 23 near each other such that the coil 231 and the coil 232 are electromagnetically coupled.

In this condition, if the user operates the operation start switch 213 in order to instruct the power transmitting circuit 212 to start transmitting power, the instructed data is input to the control circuit 216A.

The control circuit 216A, corresponding to the instructed data, controls the power transmitting circuit 212 so as to perform a pre-power transmission for a predetermined time prior to the power transmitting operation of the power transmitting circuit 212. Since the power transmitting circuit 212 performs the pre-power transmission, the power transmitting circuit 212 produces an alternating voltage for the predetermined time. The produced alternating voltage is transmitted to the power receiving circuit 221 through the transformer 23.

The power receiving circuit 221 notifies the transmitting circuit 225A that the pre-power transmission is performed at the same time that the power receiving circuit 221 rectifies the transmitted alternating voltage to a direct current voltage. Based on the notification, the transmitting circuit 225A reads out the identification signal to identify the power receiving device 22A from the nonvolatile memory 224A so as to supply the read out identification signal, through the transformer 226, to the power lines 227 and 228 that are connected to both ends of the transformer 23 respectively.

Since the identification signal is transmitted to the power lines 217 and 218 through the transformer 23, the sensor 215 detects the identification signal in the power lines 217 and 218. Then, the detected identification signal is input to the control circuit 216A.

The control circuit 216A determines whether or not the identification signal detected by the sensor 215 coincides with an identification signal for reference. As a result of the determination, if both coincide, the control circuit 216A controls the power transmitting circuit 212 so as to start transmitting power. At the same time, the control circuit 216A loads the power measured by the power meter 219B so as to start accumulating the power. If both fail to coincide, the control circuit 216A controls the power transmitting circuit 212 to not start transmitting power.

The power transmitting device 21A starts charging in this way. In the charging time, the power receiving circuit 221 charges the secondary battery 223 in the power receiving device 22A. In addition, the charge discharge control circuit 222 monitors the charging conditions of the secondary battery 223. Upon completion of the charging operation, the charge discharge control circuit 222 controls the power receiving circuit 221 so as to stop charging the secondary battery 223. At the same time, the charge discharge control circuit 222 sends the charge completion signal showing the completion of the charging operation to the transmitting circuit 225A.

As a result, the transmitting circuit 225A reads out the charge completion signal showing the charge completion of the secondary battery 223 from the nonvolatile memory 224A so as to supply the read out charge completion signal, through the transformer 226, to the power lines 227 and 228 that are connected to both ends of the transformer 23 respectively.

Since the charge completion signal is transmitted to the power lines 217 and 218 through the transformer 23, the sensor 215 detects the charge completion signal in the power lines 217 and 218. Then, the detected charge completion signal is input to the control circuit 216A.

If the sensor 215 receives the charge completion signal, the control circuit 216A calculates a fee for the charging operation based on the accumulated value of the power and then controls the display unit 219C so as to display the calculated fee for the charging operation.

Accordingly, a user of the third embodiment can pay the fee for the charging operation.

Next, a configuration of a contactless power transmitting device of a fourth embodiment of the present invention will be explained with reference to FIG. 6.

In the first embodiment shown in FIG. 2, as described above, if the secondary battery 134 in the power receiving device 13 runs out when a user is away from his or her office, the secondary battery 134 can be charged at the place where the user is located using the power transmitting-receiving sharing device 12. In the second embodiment shown in FIG. 4, as above-mentioned, when the power transmitting device 21 charges the secondary battery 223 in the power receiving device 22, an improvement in safety and fraud prevention or the like in the charging operation can be achieved.

Therefore, in the fourth embodiment, each configuration of the first embodiment and second embodiment are organized such that the secondary battery of cellular phones or the like can be charged at the place where a user is located when the user is away from his or her office and an improvement in safety of the charging operation and fraud prevention or the like in the charging operation also can be achieved.

Figure 6:
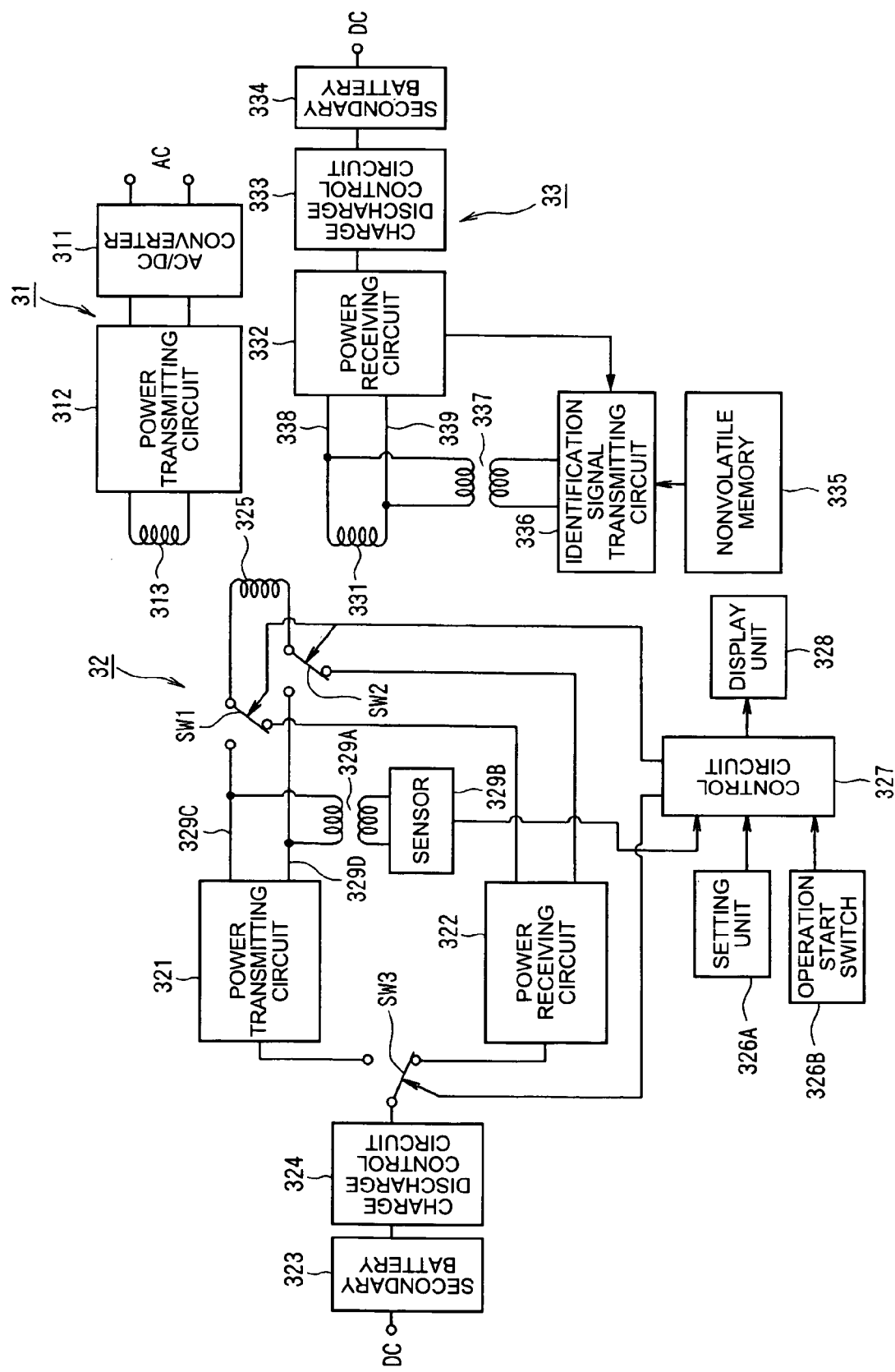
FIG. 6 is a block diagram illustrating the configuration of a fourth embodiment of the invention.

As shown in FIG. 6, the fourth embodiment includes a power transmitting device 31 functioning as the charger, a power transmitting-receiving sharing device 32 functioning as the charger and including a secondary battery 323, and a power receiving device 33 including the secondary battery 334.

The power transmitting device 31 is electromagnetically coupled to the power transmitting-receiving sharing device 32 or the power receiving device 33 so as to form the contactless power transmitting device respectively. If the power transmitting device 31 is coupled to the power transmitting-receiving sharing device 32, the power transmitting device 31 charges the secondary battery 323 included in the power transmitting-receiving sharing device 32. If the power transmitting device 31 is coupled to the power receiving device 33, the power transmitting device 31 charges the secondary battery 334 included in the power receiving device 33.

In addition, the power transmitting-receiving sharing device 32 forms a contactless power transmitting device by electromagnetically coupling to the power receiving device 33 so as to charge the secondary battery 334 included in the power receiving device 33. Prior to the charging operation, the power transmitting-receiving sharing device 32 determines safety, fraud and the like of the charging operation by utilizing the identification signal. If the safety and like can be ensured, the power transmitting-receiving sharing device 32 starts charging.

Here, the power transmitting-receiving sharing device 32 is used, for example, as a power supply for portable computers. The power receiving device 33 is used, for example, as a power supply for cellular phones.

Next, a specific configuration of each part of the fourth embodiment will be explained with reference to FIG. 6.

As shown in FIG. 6, the power transmitting device 31 includes an AC/DC converter 311, a power transmitting circuit 312, and a coil 313.

The AC/DC converter 311, which, for example, converts the alternating voltage of, for example 100 or 110 volts, supplied to homes to a predetermined direct current voltage, supplies the converted direct current voltage to the power transmitting circuit 312. The power transmitting circuit 312, which produces an alternating voltage having a predetermined frequency by using the direct current voltage from the AC/DC converter 311, supplies the produced alternating voltage to the coil 313.

As shown in FIG. 6, the power transmitting-receiving sharing device 32 includes a power transmitting circuit 321, a power receiving circuit 322, a secondary battery 323, a charge discharge control circuit 324, a coil 325, the switches SW1 to SW3, a setting unit 326A, an operation start switch 326B, a control circuit 327, a display unit 328, a transformer 329A and a sensor 329B. The power transmitting circuit 321 produces an alternating voltage having a predetermined frequency using the direct current voltage supplied from the secondary battery 323 in operation, supplying the produced alternating voltage to the coil 325. If electric power is transmitted from the power transmitting device 31 to the power receiving circuit 322 by electromagnetically coupling between the coil 325 in the power transmitting-receiving sharing device 32 and the coil 313 in the power transmitting device 31, the power receiving circuit 322 rectifies an alternating voltage induced in the coil 325 to a direct current voltage. That is, the power receiving circuit 322 is an AC-DC converting circuit. The direct current voltage produced in the power receiving circuit 322 is supplied to the secondary battery 323 through the charge discharge control circuit 324 so as to charge the secondary battery 323.

The secondary battery 323 can be repeatedly used by charging after being discharged, for example, such as the lithium-ion battery.

If the secondary battery 323 is charged by the power receiving circuit 322, the charge discharge control circuit 324 controls the charging operation. If the power transmitting circuit 321 or loads (not shown) are operated by the secondary battery 323, the charge discharge control circuit 324 controls the discharge.

If the coil 325 is used by approaching the coil 313 in the power transmitting device 31, the coil 325 and the coil 313 are electromagnetically coupled so as to form a transformer therebetween. If the coil 325 is used by approaching the coil 331 in the power receiving device 33, the coil 325 and the coil 331 are electromagnetically coupled so as to form a transformer therebetween. That is, the coils 313, 325, and 331 can be electromagnetically interconnected and also be separated mutually.

The switches SW1 and SW2 selectively couple the coil 325 to either the power transmitting circuit 321 or the power receiving circuit 322.

Also, the switch SW3 selectively couples the secondary battery 323 to either the power transmitting circuit 321 or the power receiving circuit 322.

Each contact of the switches SW1 to SW3 is normally, for example, coupled to the power receiving circuit 322 side as shown in FIG. 6.

The setting unit 326A, in which a user selectively sets the use of the power transmitting circuit 321 or the power receiving circuit 322, inputs the set data to the control circuit 327. The operation start switch 326B, which instructs the start of the power transmitting from the power transmitting circuit 321, inputs the instruction data to the control circuit 327. The transformer 329A electromagnetically couples the sensor 329B to the power lines 329C and 329D that are connected to both ends of the coil 325 respectively.

The sensor 329B, which detects an identification signal transmitted in the power lines 329C and 329D, inputs the detected identification signal to the control circuit 327. The display unit 328, which is configured with a liquid crystal display unit or the like, displays predetermined information as above described.

The control circuit 327 displays the operating conditions on the display unit 328 according to the set data from the setting unit 326A and controls the contact switching of the switches SW1 to SW3.

When the control circuit 327 controls the power transmitting circuit 321 so as to start transmitting power by the instruction from the operation start switch 326B, prior to the power transmitting, the control circuit 327 controls the power transmitting circuit 321 so as to perform a pre-power transmission for a predetermined time. During the pre-power transmission, the control circuit 327 determines whether or not an identification signal (described later) received by the sensor 329A coincides with an identification signal for reference.

In addition, as a result of the determination, if both coincide, the control circuit 327 controls the power transmitting circuit 321 so as to start transmitting power. If both fail to coincide, the control circuit 327 controls the power transmitting circuit 321 to not start transmitting power.

As shown in FIG. 6, the power receiving device 33 includes a coil 331, a power receiving circuit 332, a charge discharge control circuit 333; a secondary battery 334, a nonvolatile memory 335, an identification signal transmitting circuit 336 and a transformer 337.

If the coil 331 is used by approaching the coil 313 in the power transmitting device 31, the coil 331 and the coil 313 are electromagnetically coupled so as to form a transformer therebetween. Also, if the coil 331 is used by approaching the coil 325 in the power transmitting-receiving sharing device 32, the coil 331 and the coil 325 are electromagnetically coupled so as to form a transformer therebetween. The alternating voltage induced in the coil 331 by electromagnetic coupling is supplied to the power receiving circuit 332.

The power receiving circuit 332 rectifies the alternating voltage induced in the coil 331 to a direct current voltage so as to be output.

The direct current voltage output from the power receiving circuit 332 is supplied to the secondary battery 334 through the charge discharge control circuit 333 so as to charge the secondary battery 334. If the secondary battery 334 is charged by the output from the power receiving circuit 332, the charge discharge control circuit 333 controls the charging operation. If loads (not shown) are operated by the secondary battery 334, the charge discharge control circuit 333 controls the discharge.

The nonvolatile memory 335 stores the identification signal to identify the power receiving device 32 as a form of digital data. The identification signal is read out by the identification signal transmitting circuit 336. The identification signal transmitting circuit 336 supplies the identification signal read out from the nonvolatile memory 335 to the power lines 338 and 339 that are connected to both ends of the coil 331 respectively through the transformer 337.

Next, an operation example of the fourth embodiment configured as above-mentioned will be explained with reference to FIG. 6.

In this example, the case in which the power transmitting-receiving sharing device 32 is used as a power supply for portable computers, and the power receiving device 33 is used as a power supply for cellular phones will be explained.

Firstly, the case in which the secondary battery 323 in the power transmitting-receiving sharing device 32 is charged using the power transmitting device 31 will be explained. In this case, a user places the coil 325 in the power transmitting-receiving sharing device 32 near the coil 313 in the power transmitting device 31 such that the coil 325 and the coil 313 are electromagnetically coupled.

In this condition, if the user sets the setting for charging the secondary battery 323 using the power transmitting device 31 to the setting unit 326A, the set data is input to the control circuit 327. The control circuit 327 controls the display unit 328 to display that the secondary battery 323 is charged using the power transmitting device 31 according to the set data. Also, the control circuit 327 controls the switches SW1 to SW3 so as to fix each contact to the power receiving circuit 322 side.

As a result, the power transmitting device 31 starts to charge the secondary battery 323 in the power transmitting-receiving sharing device 32.

In this charging sequence, the secondary battery 323 is charged by the power receiving circuit 322. Also, the charge discharge control circuit 324 monitors the charging conditions of the secondary battery 323. When the charging operation is completed, the charge discharge control circuit 324 controls the power receiving circuit 322 to stop charging the secondary battery 323.

Next, the case in which the secondary battery 334 in the power receiving device 33 is charged by the power transmitting device 31 will be explained. In this case, a user places the coil 331 in the power receiving device 33 near the coil 313 in the power transmitting device 31 such that the coil 331 and the coil 313 are electromagnetically coupled.

As a result, the power transmitting device 31 starts to charge the secondary battery 334 in the power receiving device 33.

In this charging sequence, the secondary battery 334 is charged by the power receiving circuit 332. Also, the charge discharge control circuit 333 monitors the charging conditions of the secondary battery 334. When the charging operation is completed, the charge discharge control circuit 333 controls the power receiving circuit 332 to stop charging the secondary battery 324.

Next, the following case will be explained. In the case, a user is away from his or her office and carries a cellular phone in which the power receiving device 33 is used (included) and a portable computer in which the power transmitting-receiving sharing device 32 is used. Since the charge of the secondary battery 334 runs out, the secondary battery 334 in the power receiving device 33 used in the cellular phone needs to be charged at the place where the user is located.

In this case, the user places the coil 131 in the power receiving device 33 near the coil 325 in the power transmitting-receiving sharing device 32 such that the coil 331 and the coil 325 are electromagnetically coupled at the place where the user is located.

In this condition, if the user sets the setting for charging the secondary battery 334 using the power transmitting-receiving sharing device 32 to the setting unit 326A, the set data is input to the control circuit 327. The control circuit 327 controls the display unit 328 to display that the secondary battery 334 is charged by the power transmitting-receiving sharing device 32 according to the set data. Also, the control circuit 327 controls the switches SW1 to SW3 so as to fix each contact to the opposite position shown in FIG. 2, namely to the power transmitting circuit 321 side.

In this condition, if the user operates the operation start switch 326B in order to instruct the power transmitting circuit 321 to start the operation of transmitting power, the instructed data is input to the control circuit 327. The control circuit 327, corresponding to the instructed data, controls the power transmitting circuit 321 so as to perform a pre-power transmission for a predetermined time prior to the power transmitting operation of the power transmitting circuit 321. Since the power transmitting circuit 321 performs the pre-power transmission, the power transmitting circuit 321 produces an alternating voltage for the predetermined time. The produced alternating voltage is transmitted to the power receiving circuit 332 in the power receiving circuit 33 through the coil 325 and the coil 331 that are electromagnetically coupled.

The power receiving circuit 332 notifies the identification signal transmitting circuit 336 that the pre-power transmission is performed at the same time that the power receiving circuit 332 rectifies the transmitted alternating voltage to a direct current voltage. Based on the notification, the identification signal transmitting circuit 336 reads out the identification signal to identify the power receiving device 33 from the nonvolatile memory 335 so as to supply the read out identification signal, through the transformer 337, to the power lines 338 and 339 that are connected to both ends of the coil 331 respectively.

Since the identification signal is transmitted to the power lines 329C and 329D through the coil 331 and the coil 325 that are electromagnetically coupled, the sensor 329B detects the identification signal in the power lines 329C and 329D. Then, the detected identification signal is input to the control circuit 327.

The control circuit 327 determines whether or not the identification signal detected by the sensor 329A coincides with an identification signal for reference. As a result of the determination, if both coincide, the control circuit 327 controls the power transmitting circuit 321 so as to start transmitting power. If both fail to coincide, the control circuit 327 controls the power transmitting circuit 321 to not start transmitting power.

If the power transmitting circuit 321 starts the power transmitting, the power transmitting-receiving sharing device 32 starts to charge the secondary battery 334 in the power receiving device 33.

In this charging sequence, the secondary battery 334 is charged by the power receiving circuit 332. Also, the charge discharge control circuit 333 monitors the charging conditions of the secondary battery 334. When the charging operation is completed, the charge discharge control circuit 333 controls the power receiving circuit 332 so as to stop charging the secondary battery 334.

As above explained, in the fourth embodiment, the power transmitting-receiving sharing device 32 forms a contactless power transmitting device by electromagnetically coupling to the power receiving device 33 so as to charge the secondary battery 334 included in the power receiving device 33. Prior to the charging operation, the power transmitting-receiving sharing device 32 determines safety, fraud and the like of the charging operation by utilizing the identification signal. Therefore, an improvement in safety and fraud prevention in the charging operation can be achieved.

Next, a fifth embodiment of the present invention will be explained with reference to FIG. 7.

In the fourth embodiment shown in FIG. 6, as above described, if the secondary battery 334 in the power receiving device 33 runs out when a user is away from his or her office, the secondary battery 334 can be charged at the place where the user is located using the power transmitting-receiving sharing device 32.

In this case, it is not preferable that the secondary battery 323 is exhausted in order to charge the secondary battery 334 in the power receiving device 33 while the secondary battery 323 in the power transmitting-receiving sharing device 32 is used.

The charge discharge control circuit 324 in the power transmitting-receiving sharing device 32 monitors the discharging conditions of the secondary battery 323 if the power transmitting circuit 321 is operated using the secondary battery 323. Thus, when the secondary battery 323 is discharged, the charge discharge control circuit 324, for example, performs counting with a count-down counter. The counting is referred as remaining charge data of the secondary battery 323.

In the fifth embodiment, when the secondary battery 324 in the power receiving device 33 is charged using the power transmitting-receiving sharing device 32, the secondary battery 323 in the power transmitting-receiving sharing device 32 is prevented from running out by using its remaining charge data.

Figure 7:
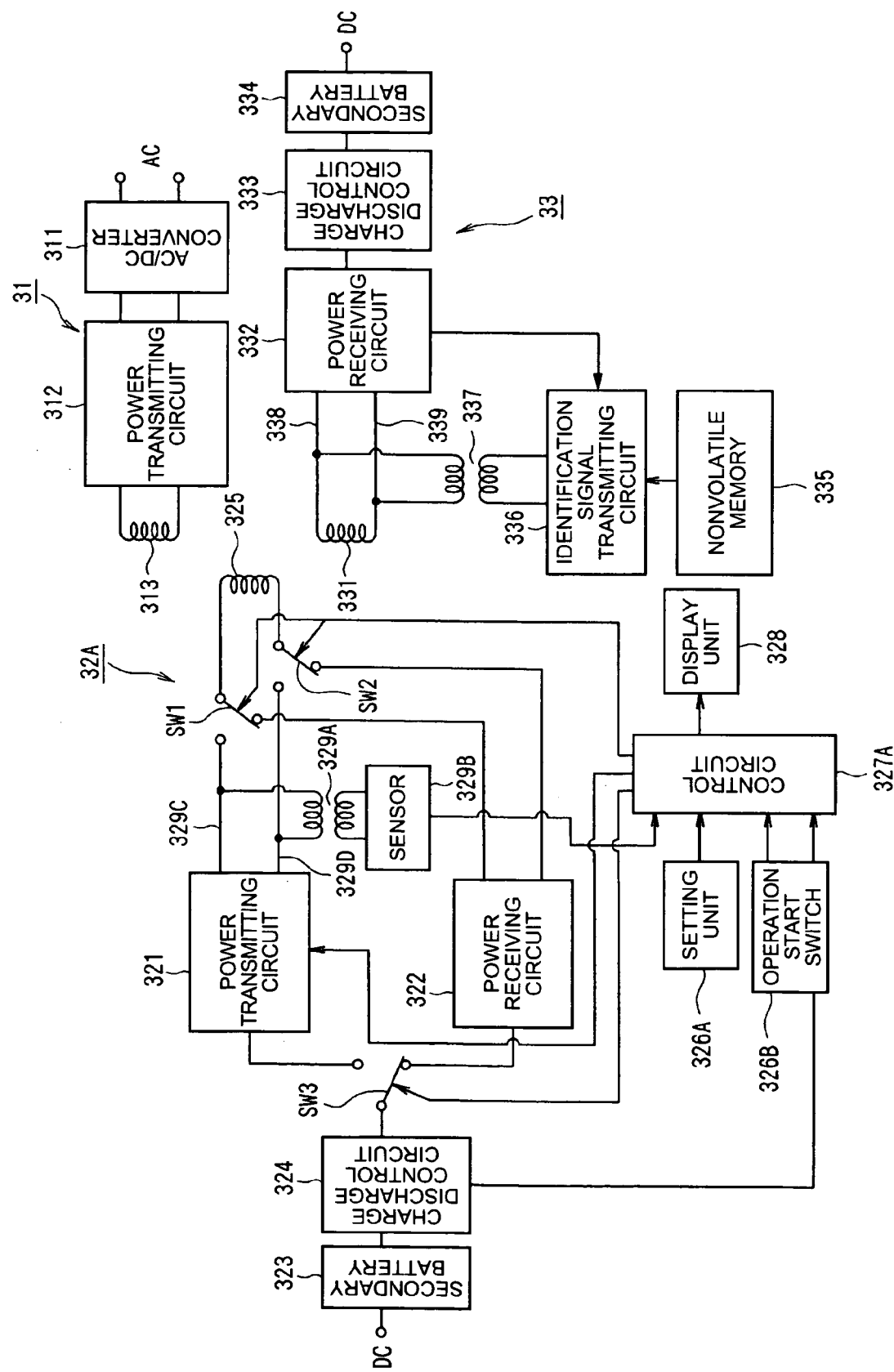
FIG. 7 is a block diagram illustrating the configuration of a fifth embodiment of the invention.
Figure 8:
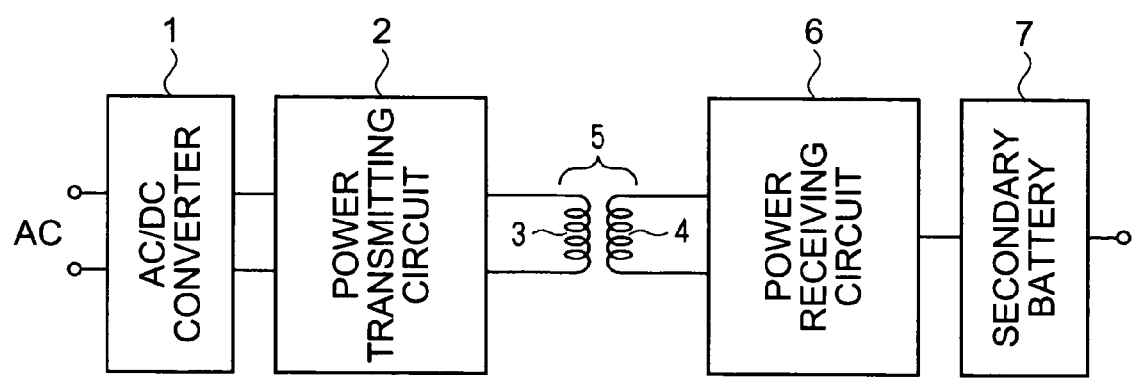
FIG. 8 is a block diagram illustrating an example of a conventional device.

For this purpose, in the fifth embodiment, the power transmitting-receiving sharing device 32 shown in FIG. 6 is replaced with a power transmitting-receiving sharing device 32A shown in FIG. 7.

Consequently, during the charging of the secondary battery 334 in the power receiving device 33, the remaining charge data from the charge discharge control circuit 324 is input to a control circuit 327A in the power transmitting-receiving sharing device 32A.

If the value of the remaining charge data shows a predetermined value or less during the charging of the secondary battery 334 in the power receiving device 33, the control circuit 327A stops the power transmitting operation of the power transmitting circuit 321 or controls the switch SW3 so as to select its contact from the power receiving circuit 321 side to the power transmitting circuit 322 side.

The configuration of the remaining parts of the power transmitting-receiving sharing device 32A are the same as those of the power transmitting-receiving sharing device 32 shown in FIG. 6. The same elements are given the same label and a duplicate explanation is omitted.

Also, since the power transmitting device 31 and the power receiving device 33 in the fifth embodiment are the same as the power transmitting device 31 and the power receiving device 33 in FIG. 6, explanations for them are omitted.

As above explained, according to the fifth embodiment, when the secondary battery 324 in the power receiving device 33 is charged using the power transmitting-receiving sharing device 32 when a user is away from his or her office, the secondary battery 323 in the power transmitting-receiving sharing device 32 can be prevented from running out.

What is claimed is:

1. A contactless power transmitting device, comprising:
a power transmitting device;
a power transmitting-receiving sharing device; and
a power receiving device,
wherein the power transmitting device includes:
a first coil; and
a power transmitting means producing an alternating current supplied to the first coil if electromagnetically coupling the first coil to one of a second coil and a third coil;
the power transmitting-receiving sharing device includes:
the second coil;
a first secondary battery;
a power transmitting means producing an alternating current supplied to the second coil using the first secondary battery as a power supply if electromagnetically coupling the second coil to the third coil; and
a power receiving means converting an alternating current induced in the second coil to a direct current if electromagnetically coupling the second coil to the first coil to charge the first secondary battery with the converted direct current; and
the power receiving device includes:
the third coil;
a second secondary battery; and
a power receiving means converting an alternating current induced in the third coil to a direct current if electromagnetically coupling the third coil to one of the first coil and the second coil to charge the second secondary battery with the converted direct current.

2. A contactless power transmitting device, comprising:
a power transmitting device;
a power transmitting-receiving sharing device; and
a power receiving device,
wherein the power transmitting device includes:
a first coil; and
a power transmitting means producing an alternating current supplied to the first coil;
the power transmitting-receiving sharing device includes:
a second coil;
a first secondary battery;
a power transmitting means producing an alternating current supplied to the second coil;
a power receiving means converting an alternating current induced in the second coil;
a first coupling means selectively coupling the second coil to one of the power transmitting means and the power receiving means;
a second coupling means selectively coupling the first secondary battery to one of the power transmitting means and the power receiving means; and
a control means controlling the coupling of the first coupling means and the second coupling means respectively based on selection data; and
the power receiving device including:
a third coil;
a second secondary battery; and
a power receiving means converting an alternating current induced in the third coil to a direct current to charge the second secondary battery with the converted direct current,
wherein the first coil, the second coil, and the third coil are electromagnetically coupled to each other and separable from each other.

3. The contactless power transmitting device according to claim 2, wherein:
the power transmitting-receiving sharing device further includes:
a setting means selectively setting a use of one of the power transmitting means and the power receiving means to the control means; and
a display means displaying a setting condition of the setting means; and
the control means controls the coupling of the first coupling means and the second coupling means based on a setting of the setting means.

4. The contactless power transmitting device according to claim 2, wherein:
the power transmitting-receiving sharing device further includes a remaining charge measuring means measuring a remaining charge of the first secondary battery if the first secondary battery is used as a power supply for the power transmitting means; and
the control means stops operation of the power transmitting means if a value of the measured remaining charge of the remaining charge measuring means is equal to or less than a predetermined value.

5. A contactless power transmitting device, comprising:
a power transmitting device;
a power receiving device; and
a transformer,
wherein the power transmitting device includes:
a power transmitting means producing an alternating current supplied to a first coil;
a receiving means receiving an identification signal to identify the power receiving device, the identification signal being transmitted in a power line coupled to the first coil; and
a control means controlling a power transmitting of the power transmitting means at a starting time of transmitting power;
the power receiving device includes:
a power receiving means converting an alternating current induced in a second coil to a direct current; and
a transmitting means producing the identification signal transmitted in a power line coupled to the second coil to supply the produced identification signal to the power line; and
the transformer includes the first coil coupled to the power transmitting device and the second coil coupled to the power receiving device, the first coil and the second coil being electromagnetically coupled to each other and separable from each other, and wherein
the control means:
controls the power transmitting means to perform a pre-power transmission for a predetermined time before starting to transmit power by electromagnetically coupling the first coil and the second coil;
determines whether the identification signal received by the receiving means coincides with an identification signal for reference during the pre-power transmission, and
controls the power transmitting means to start transmitting power if both identification signals coincide with each other, and to not start transmitting power if both identification signals do not coincide with each other.

6. A contactless power transmitting device, comprising:
a power transmitting device;
a power receiving device; and
a transformer,
wherein the power transmitting device includes:
  a power transmitting means producing an alternating current supplied to a first coil;
  a power meter measuring power transmitted by the power transmitting means;
  a receiving means respectively receiving an identification signal to identify the power receiving device and an operation completion signal to show completion of a charge operation of a power receiving means, the identification signal, and the operation completion signal that are transmitted in a power line coupled to the first coil; and
  a control means controlling a power transmitting of the power transmitting means according to a reception of the receiving means;
the power receiving device includes:
  the power receiving means converting an alternating current induced in a second coil to a direct current; and
  a transmitting means respectively producing the identification signal and the operation completion signal that are transmitted in a power line coupled to the second coil to supply the produced identification signal and the operation completion signal to the power line respectively;
the transformer includes the first coil coupled to the power transmitting device and the second coil coupled to the power receiving device, the first coil and the second coil being electromagnetically coupled to each other and separable from each other, and wherein:
the control means:
  controls the power transmitting means to perform a pre-power transmission for a predetermined time before starting to transmit power by electromagnetically coupling the first coil and the second coil;
  determines whether the identification signal received by the receiving means coincides with an identification signal for reference during the pre-power transmission;
  controls the power transmitting means to start transmitting power and simultaneously starts to load a measured value of the power meter if both identification signals coincide with each other;
  controls the power transmitting means to not start transmitting power, and calculates a fee for charging based on the measured value in a case of receiving the operation completion signal by the receiving means after starting to transmit power by the power transmitting means, if both identification signals do not coincide with each other.

7. The contactless power transmitting device according to claim 6, further comprising a display means displaying the fee for charging calculated by the control means.

8. A contactless power transmitting device, comprising:
a power transmitting device;
a power receiving device; and
a power transmitting-receiving sharing device,
wherein the power transmitting device includes:
  a first coil; and
  a power transmitting means producing an alternating current supplied to the first coil;
the power receiving device includes:
  a third coil;
  a second secondary battery;
  a power receiving means converting an alternating current induced in the third coil to a direct current to charge the second secondary battery with the converted direct current; and
  a transmitting means producing an identification signal to identify the power receiving device to supply the produced identification signal to the power line when starting the power receiving means to receive power, the identification signal being transmitted in a power line coupled to the third coil;
the power transmitting-receiving sharing device includes:
  a second coil;
  a first secondary battery;
  a power transmitting means producing an alternating current supplied to the second coil;
  a power receiving means converting an alternating current induced in the second coil to a direct current;
  a receiving means receiving the identification signal from the transmitting means, the identification signal being transmitted in a power line coupled to the second coil;
  a first coupling means selectively coupling the second coil to one of the power transmitting means and the power receiving means;
  a second coupling means selectively coupling the first secondary battery to one of the power transmitting means and the power receiving means; and
  a control means controlling the power transmitting means, and wherein
the control means:
  controls the power transmitting means and the second coil to be coupled by the first coupling means and, simultaneously, the first secondary battery and the power transmitting means to be coupled by the second coupling means;
  controls the power transmitting means to perform a pre-power transmission for a predetermined time before starting to transmit power by electromagnetically coupling the second coil and the third coil;
  determines whether the identification signal received by the receiving means coincides with an identification signal for reference during the pre-power transmission;
  controls the power transmitting means to start transmitting power if both identification signals coincide with each other, and to not start transmitting power if both identification signals do not coincide with each other,
wherein the first coil, the second coil, and the third coil are electromagnetically coupled to each other and separable from each other.

9. The contactless power transmitting device according to claim 8, wherein:
the power transmitting-receiving sharing device further includes a remaining charge measuring means measuring a remaining charge of the first secondary battery if the first secondary battery is used as a power supply for the power transmitting means; and
the control means stops operation of the power transmitting means if a value of the measured remaining charge of the remaining charge measuring means is equal to or less than a predetermined value.

* * * * *